May 19, 1964      A. GORDON      3,133,355
MUSCLE MYOTONOMETER
Filed Oct. 27, 1961      2 Sheets-Sheet 1
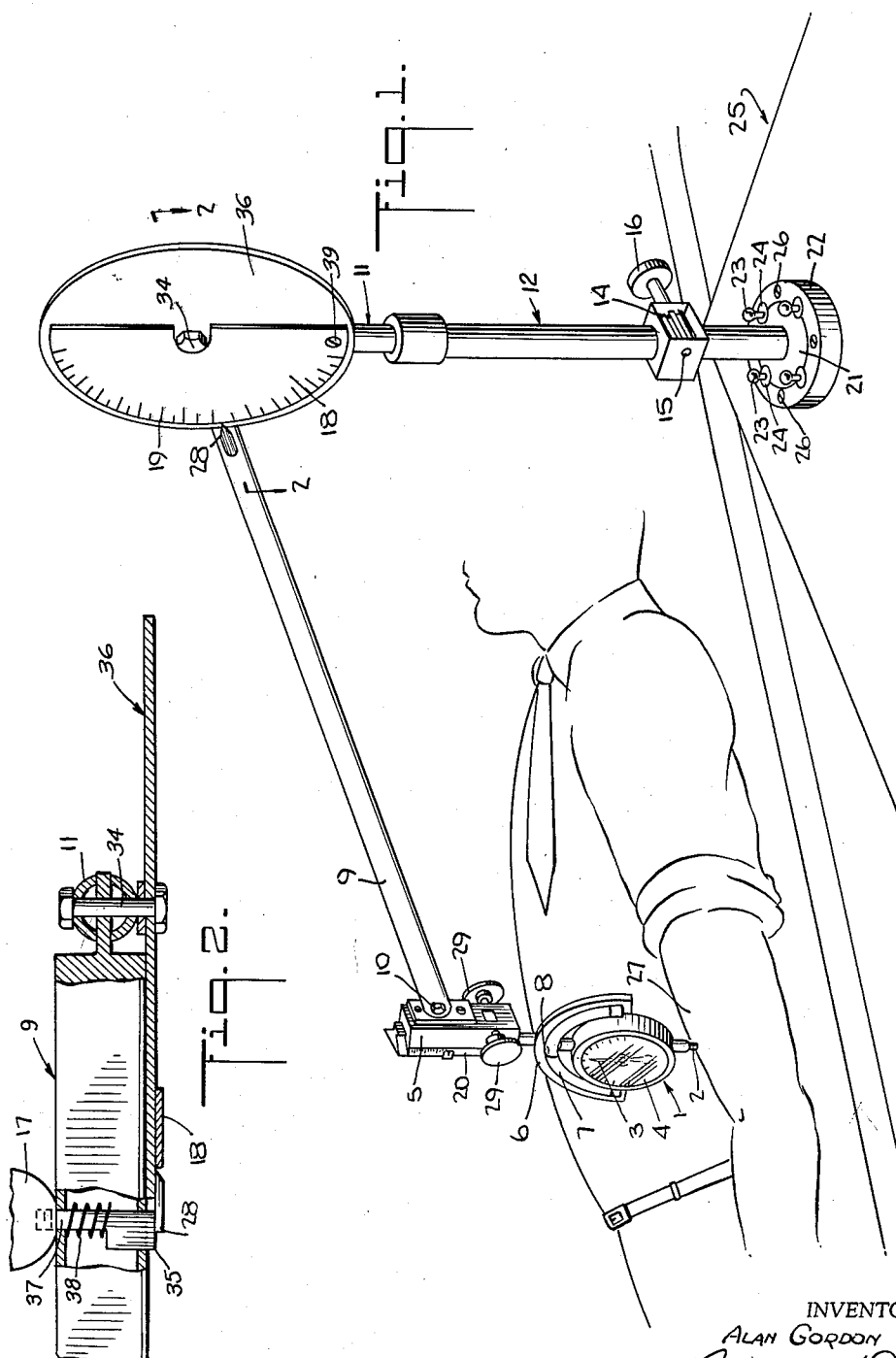
INVENTOR.
ALAN GORDON
BY Gustav Drews
his ATTORNEY May 19, 1964
A. GORDON
3,133,355
MUSCLE MYOTONOMETER
Filed Oct. 27, 1961
2 Sheets—Sheet 2
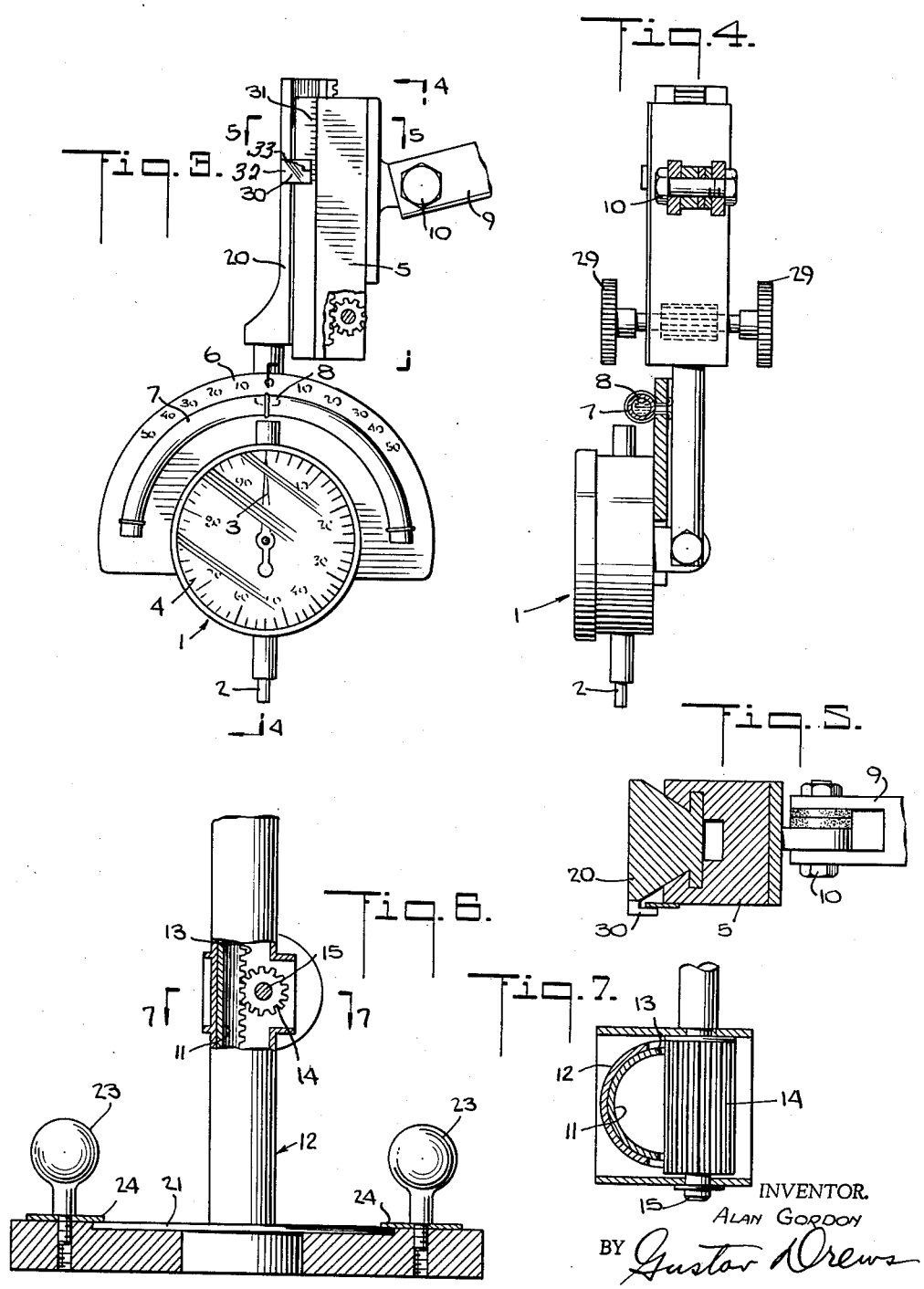
INVENTOR.
ALAN GORDON
BY Gustav Drews
his ATTORNEY

United States Patent Office 3,133,355
Patented May 19, 1964

3,133,355
MUSCLE MYOTONOMETER
Alan Gordon, 443 Newport St., Brooklyn 7, N.Y.
Filed Oct. 27, 1961, Ser. No. 148,107
3 Claims. (Cl. 33—172)

This invention relates in general to devices for measuring muscle tone or resting muscle tension and more particularly to so-called muscle myotonometers.

Among the objects of the present invention it is aimed to provide an improved device for testing muscle tone or resting muscle tension consisting in an apparatus including a pressure sensitive dial indicator associated with a level, a micrometer, and levers for positioning the pressure sensitive dial indicator in engagement with the muscle unit to be tested.

It is still another object of the present invention to provide an improved device for testing muscle tone or resting muscle tension consisting in a pressure sensitive dial indicator associated with a level, a micrometer, and levers for locating the pressure sensitive dial indicator for engagement with the muscle or unit to be tested and a scale associated with said levers to predetermine the position of the levers relative to one another.

These and other features, capabilities, and advantages of the invention will appear from the subjoined detailed description of one specific embodiment thereof illustrated in the accompanying drawings in which:

FIG. 1 is a perspective of the device showing the same in use.

FIG. 2 is a section on the line 2—2 of FIG. 1.

FIG. 3 is an enlarged side elevational view of a part of the device.

FIG. 4 is a section on the line 4—4 of FIG. 3.

FIG. 5 is a section on the line 5—5 of FIG. 3.

FIG. 6 is a fragmental side elevational view partly in section of the base of the device.

FIG. 7 is a section on the line 7—7 of FIG. 6.

In the embodiment shown the pressure sensitive dial indicator 1 has a stem 2 which is connected with the mechanism of the dial indicator 1 to operate the needle 3 to register the pressure on the dial 4. The unit 1 is connected to the arm 5 which has a plate 6 disposed above the unit 1 to which in the present instance there is provided a level 7 having a column of mercury in it adjusted to produce a bubble 8 in the glass arcuate unit 7 depending upon the position of the indicator 1 relative to the horizontal according to the convention.

The arcuate unit 7 extends to either side of the arm 5 with a reading of zero at the middle with substantially fifty graduations to eiether side of the zero corresponding to pressures in dynes. The arm 5 is in turn pivotally connected to the arm 9 and anchored to the same by a set screw 10.

The arm 9 in turn is connected to the bolt 34 mounted on the supporting disc 36, see FIG. 2, fixed by the screw 39 to the vertical standard 11 telescopically connected to the tubular upright 12 provided with a rack 13, connected to a ratchet gear 14, operably connected to the stub shaft 15 having the handle 16.

The arm 9 is positioned and anchored relative to the standard 11 by the set screw 17. Preferably, with the center of the set screw 17 as a center, a dial 18 is provided with graduations 19 thereon registering with the indicator 28 on the pin 35 slidably mounted in the arm 9, FIG. 2, to indicate the position of the arm 9 relative to the standard 11. As shown in FIG. 2, the standard 11 is bolted by the bolt 34 to the supporting disk 36. On the supporting disk 36, see FIGS. 1 and 2, is secured the dial 18 on which appears the graduations 19. The set screw 17, FIG. 2, consists of a ball which is threadedly connected to the stem 37 of the pin 35. The stem 37 when drawn inwardly by the set screw 17 acts against the tension of the spring 38 in turn to press the indicator 28 against the supporting disk 36.

The arm 5 has connected thereto a micrometer 20 calibrated in sixty-fourths of an inch which is connected to the dial indicator 1.

The tubular upright 12 is fixed to the disk 21 which in turn is anchored to the base 22 by means of the set screws 23 provided with the annular disks 24 to extend over the plate 21 with the set screws 23 screw threadedly connected to the base 22 so that when the set screws 23 are turned, the disks 24 will engage the disk 21 and anchor the same in position to the base 22. The base 22 may be secured to any suitable support such as a table 25 by the screws 26.

In the practice of physical therapy where it is necessary to determine the tone of muscles or resting tension of muscles, it has been found that the tone or resting tension of a muscle can be determined relative to its normal counterpart in the same human being. As an instance, with a patient, before applying this instrument to the muscle to be tested for treatment, it is applied to its normal counterpart as follows:

Assume that the biceps of the right arm are paralyzed or impaired, in which case the muscles will be softer than their normal counterpart. A test will be made with this instrument of the biceps 27 of the left arm, which biceps are the normal counterpart of the similar biceps of the right arm that has been impaired. Assume that the tension recorded on the dial indicator 1 of the normal counterpart is .2 of a dyne, then the apparatus will be brought into contact with the biceps of the right arm which has been impaired and the reading made as aforesaid. The reading normally should be less than .2 of a dyne, the reading of the tension of the normal counterpart or of the corresponding biceps 27 of the left arm.

Heretofore, tests have been attempted of muscle tone and of resting muscle tension by so-called "rule of thumb" and wholly dependent upon subjective judgment. Consequently, one operator with a better coordination of mind and muscle than another operator, and in turn one operator of much greater physical strength than another operator, might come out with entirely different readings so that reliance could not be placed upon these "rule of thumb" methods.

According to the present invention, on the other hand, substantially precise readings may be attained mechanically, in no way dependent upon the comparative coordination of muscle and mind of different operators and in turn dependent upon the comparative strength of different operators.

In the present instance the contact between the dial indicator 1 and the biceps 27 is made by the stem 2, an exposed contact pin, extending from the lower end of the dial indicator 1 and operatively connected to the needle 3.

The stem 2 will be positioned on the biceps 27 and the set screws 10 and 17 actuated to fixed the position of the arms 5 and 9 relative to the standard 11. Thereupon the micrometer control gear and handles 29 will be actuated to enable the indicator 1 relative to the arm 5 to descend a predetermined distance recorded by the pointer 30 on the scale 31. This descent depending upon the firmness of the biceps 27 will be recorded by the needle 3 on the dial 4. Thereupon, with this predetermined position of the indicator 1, the apparatus will be transferred or the patient moved so that the stem 2 will just engage or just clear the injured biceps of the left arm where the needle 3 will register zero and then the screws 29 actuated to lower the dial indicator 1 relative to the arm 5 the same distance as theretofore recorded on the scale 31 when testing the healthy biceps 27, when due either to the greater or less rigidity of the injured biceps, the resistance offered by the injured biceps will be recorded on the dial 4 by the needle 3. This reading will then be compared to the reading taken with the healthy biceps 27 to determine the condition, muscle tone, or resting muscle tension of the injured biceps with a view to guiding the physician to prescribing the proper treatment, therapeutic or otherwise.

The pointer 30 consists of a magnifying glass 32 having a mark 33 thereon to register with the graduations on the scale 31.

It is obvious that various changes and modifications may be made without departing from the general spirit of the invention as set forth in the appended claims.

I claim:

1. In a muscle myotonometer, the combination with a pressure sensitive dial indicator having a dial and a needle to register pressure on the dial, an exposed contact pin operatively connected to said needle and engaging the muscle to be tested, a first arm on which said indicator is mounted, a second arm pivotally connected to said first arm, a standard pivotally connected to said second arm, means for fixing said standard to a support, a set screw for anchoring said second arm to said first arm, an enlarged disk fixed to said standard, a set screw mounted on said second arm and cooperating with the periphery of said disk to anchor said second arm in position relative to said standard, and an arcuate level connected to said indicator to enable determining the angle of said indicator and in turn of said pin to the muscle being tested, the set screw connecting said second arm to said first arm to fix the position of the level at the angle at which the pin of the indicator engages the muscle.

2. The combination as set forth in claim 1 having an enlarged second dial having graduations thereon secured to said standard and concentric to the pivotal connection of said second arm to said standard, and a pointer on said second arm registering with the graduations on said second dial to indicate the angle of said second arm relative to said second dial.

3. The combination as set forth in claim 1 having a tubular upright, said standard being telescopically mounted in said upright, a rack on said standard, a gear journalled in said upright and meshing with said rack, and a handle operatively connected to said gear to actuate said gear in turn to raise or lower said standard, said means consisting of a collar secured to the support, said tubular upright rotatably mounted in said collar, a disk secured to the lower end of said upright adjacent said collar, and set screws securing said disk to said collar in turn to anchor said tubular upright in a predetermined position.

References Cited in the file of this patent

UNITED STATES PATENTS

| | | |
|---|---|---|
| 1,768,639 | Shore | July 1, 1930 |
| 1,795,296 | De Zeng | Mar. 10, 1931 |
| 2,066,699 | Skelton | Jan. 5, 1937 |
| 2,083,759 | Temple | June 14, 1937 |
| 2,919,490 | Bethamy | Jan. 5, 1960 |

FOREIGN PATENTS

| | | |
|---|---|---|
| 187,917 | Germany | Aug. 9, 1907 |
| 858,663 | France | May 3, 1940 |
| 910,078 | France | Jan. 14, 1946 |